United States Patent [19]

Fields et al.

[11] Patent Number: 4,946,946
[45] Date of Patent: Aug. 7, 1990

[54] PRODUCTION OF LOW ASH LIGNIN

[75] Inventors: Peter R. Fields, Stockton-on-Tees; Pudens L. Ragg, Spennymoor, both of England

[73] Assignee: Imperial Chemical Industries PLC, London, England

[21] Appl. No.: 260,995

[22] Filed: Oct. 21, 1988

[51] Int. Cl.$^5$ .............................................. C07G 1/00
[52] U.S. Cl. .................................................. 530/500
[58] Field of Search ...................................... 530/500

[56] References Cited

U.S. PATENT DOCUMENTS

| | | | |
|---|---|---|---|
| 2,615,883 | 10/1952 | Sweeney et al. | 530/500 X |
| 3,017,404 | 1/1962 | Ball | 530/500 |
| 3,048,576 | 8/1962 | Ball et al. | 530/500 |
| 3,223,697 | 12/1965 | Ball et al. | 530/500 |
| 3,251,716 | 5/1966 | Porter | 530/500 X |
| 3,784,408 | 1/1974 | Jaffe et al. | 127/37 |
| 3,808,192 | 4/1974 | Dimitri | 260/124 R |
| 3,817,974 | 6/1974 | Sirianni et al. | 530/500 |
| 3,895,996 | 7/1975 | Lange et al. | 530/500 X |
| 3,984,362 | 10/1976 | Sirianni et al. | 524/76 |

OTHER PUBLICATIONS

Chemical Abstracts, vol. 94, No. 2, 1981, p. 221, Abstract No. 7291v, Columbus, OH, U.S.A.; A. M. Prabhu et al.: "Studies on Electrodialytic Recovery and Decationization of Lignin from Kraft Black Liquor", and Proc. Int. Symp. Fresh Water Sea 1980, 7th (vol. 2), 425–432.

*Primary Examiner*—Earl Nielsen
*Attorney, Agent, or Firm*—Cushman, Darby & Cushman

[57] ABSTRACT

A process for the production of lignin in which lignin is precipitated from aqueous solution by acidification and agitation and the precipitated lignin is separated from accompanying liquid in which the lignin-containing solution and the acid are introduced by simultaneous cocurrent flow into an agitated mixing region, the precipitated lignin is separated not more than 60 minutes after precipitation and the separated lignin is subsequently washed. The process can form a step in a general process for the treatment of lignocellulosic materials to produce one or more products including lignin. The process enables the ash content of lignin to be reduced.

10 Claims, 3 Drawing Sheets

PRODUCTION OF LOW ASH LIGNIN

This invention relates to a process for the production of lignin.

Lignocellulosic materials such as straw may be treated to produce products of three main types, hemicellulosic sugars (particularly xylose), cellulose fibres and lignin. Generally treatments are directed towards the production of only one type of product and the others are discarded. However in U.S. Pat. No. 2,615,883 a process is proposed which enables products of all three types to be produced.

When lignin is to be produced, the lignocellulosic material is first subjected to a mild acid hydrolysis using a dilute acid, e.g. dilute sulphuric, hydrochloric or nitric acid. The hydrolysis product is then filtered to give a solution containing the hemicellulosic sugars and a solid material containing lignin and cellulose fibres and from which the sugars have been substantially removed. This solid material is then treated with an alkali, e.g. sodium hydroxide solution, in a reactor at a temperature preferably in the range 70° to 130° C. Following this alkaline treatment the resultant slurry is then filtered to give cellulose pulp and a solution containing lignin. Lignin is generally isolated from the lignin containing-solution by precipitation with an acid and subsequent filtration. A number of processes have been described for acid precipitation of lignin from lignin-containing solutions including those of U.S. Pat. Nos. 2,615,883, 3,017,404, 3,223,697, 3,808,974, 3,817,974 and 3,984,362. The lignin produced has generally been intended for use as a reinforcing filler for rubber compositions. When used for this purpose it is desirable that the lignin should have a high specific surface area, i.e. be in the form of small porous particles, and many of the processes previously described for lignin production have generally had the aim of producing lignin of appropriate particle size and porosity.

The main impurity present in currently commercially available lignin is ash. It is desirable that processes for the production of lignin should be developed in which the ash content of the lignin produced is reduced. The effect of ash and of other nonlignin constituents on the properties of lignin is discussed in U.S. Pat. No. 3984362 (col. 1, lines 59–65).

According to the present invention we provide a process for the production of lignin by precipitation from an aqueous solution containing it in which the solution is acidified and agitated at a temperature in the range 10° to 100° C., the solution being treated with sufficient acid to produce a pH in the range 1.8 to 4 thereby precipitating the lignin; and the precipitated lignin is then separated from accompanying liquid, characterised in that the lignin-containing solution and the acid are introduced by simultaneous cocurrent flow into an agitated mixing region, the precipitated lignin is separated not more than 60 minutes after precipitation and the separated lignin is subsequently washed.

The agitated mixing region can be any confined space to which the lignin-containing solution and the acid can be supplied simultaneously and cocurrently to be intimately mixed. The region is provided with a stirrer or other mixing means. The region can be an enlarged pipe into which the lignin-containing solution and the acid are supplied along narrower pipes. Preferably the region is a vessel into which the lignin-containing solution and acid are supplied separately and concurrently.

The lignin-containing solution can be derived from a number of sources. In particular it can be produced in a general process for the treatment of lignocellulosic materials such as straw to produce one or a number of products. The process of the invention for the production of lignin would then form a step in the general process. Suitably the general process could have the following steps:

1. A first step in which the lignocellulosic material is treated with dilute acid (preferably 0.5–5%) to produce a sugar-containing solution and a solid material containing lignin and cellulose;
2. A second step in which the products of the first step are separated by filtration, the sugar-containing solution being optionally treated to separate xylose therefrom;
3. A third step in which the solid material from the second step is treated with alkali solution (preferably 0.5–5%) at a temperature between 70° and 130° C. to produce a lignin-containing solution and cellulose pulp;
4. A fourth step in which the products of the third step are separated by filtration;
5. A fifth step which is the process of the invention; and
6. A sixth step in which the cellulose pulp separated in the fourth step is further treated.

The further treament of the cellulose pulp could be a process for its solubilisation and/or hydrolysis, e.g. a process in which it is treated by an acid especially hydrochloric acid in the presence of a halide of calcium, magnesium or lithium, particularly calcium chloride, or a precursor of such a halide, as described in our European Patents Nos. 44622B and 96497B.

The invention is illustrated by the accompanying drawings in which.

Figure 1:
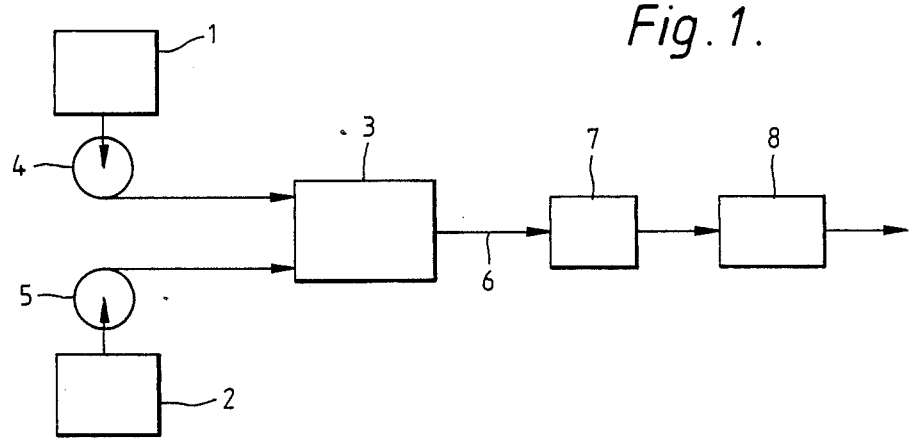
FIG. 1 is a diagram of an apparatus which can be used for the process of the invention.

The process of the invention can be carried in the apparatus shown diagrammatically in FIG. 1 of the drawings. In this lignin-containing solution from heated reservoir 1 and acid from heated reservoir 2 are pumped simultaneously and cocurrently into mixing vessel 3 by pumps 4 and 5 respectively. The mixture produced in vessel 3 is highly agitated by a variable speed agitator (not shown in the drawing) thereby subjecting the mixture to considerable shear forces. Lignin is precipitated from solution in vessel 3 and then passes from vessel 3 along channel 6 into tank 7 from whence it passes to vessel 8 in which it is separated from any remaining liquid by filtration. The filtered lignin is thereafter washed. The process of the invention can be operated as a batch or as a continuous process.

After the lignin has been precipitated, the length of time that it is allowed to stand before separation has a significant effect on its final purity. In the process of the invention the lignin is allowed to stand for no longer than 60 minutes and preferably for no longer than 10 minutes (e.g. 0.1 to 10 minutes) after precipitation. Preferably the lignin is separated by filtration but other means may be used e.g. centrifugation.

Temperature and pH also influence purity and the process of the invention is operated at a pH in the range 1.8 to 4 and a temperature in the range 10° to 100° C. The prefered pH range is 3 to 4. We have found that the ash content of lignin produced in the optimum pH range by the process of the invention can be reduced to less than 0.5%. We have found that the ash content of lignin precipitated at temperatures in the range 40° to 100° C. is low. When the lignin solution is produced by the general process outlined above its temperature is approximately 60° C. Hence preferably the process of the invention is carried out at a temperature in the range 50° to 70° C.

In the process of the invention lignin is precipitated from the highly agitated mixture of lignin solution and acid. Preferably a mechanical agitator is used to give specific power inputs greater than those obtained on a laboratory scale at agitator speeds above 2000 rpm to achieve mixing on a microscopic scale. The stirrer speeds required to achieve this objective will vary depending upon stirrer geometry, the geometry and fittings of the vessel in which mixing occurs and fluid aspect ratio, i.e. proportion of the agitator immersed in fluid. Any type of agitator may be used for example paddles, turbines or propellers. The precipitated lignin is washed with water after separation preferably at a temperature in the range 20° to 60° C.

Preferred acids are inorganic acids in particular sulphuric and hydrochloric acids but other acids can be used. Preferably the acid supplied to the mixing region has a concentration in the range 0.1 to 5M, particularly 0.5 to 5M. The lignin-containing solution which is supplied to the mixing region preferably contains lignin at a concentration of 2% to 10% w/v.

The process of the invention enables lignin having a high purity and low ash content to be produced. The purity and reactivity of the lignin produced is such that it can be used in a wide range of products, e.g. dyestuff dispersants, resins, adhesives, concrete additives, oil well drilling muds, animal feed pellets, gypsum boards and in the production of fine chemicals.

The invention is illustrated by the following Examples:

EXAMPLE 1

Figure 2:
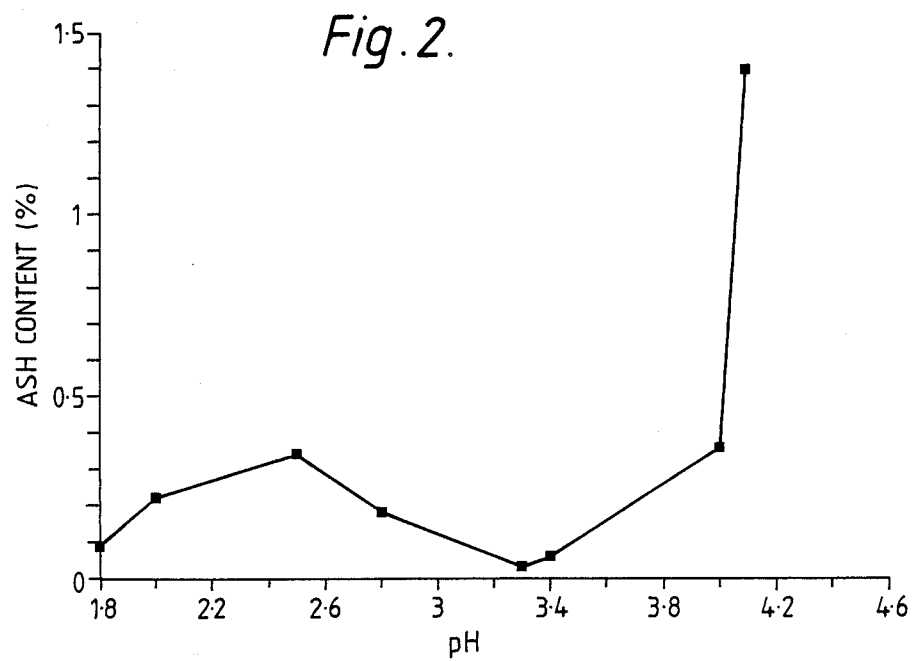
FIG. 2 is a graph of % ash content as ordinate against pH as abscissa setting out the results of Example 1 below.

Using the apparatus of FIG. 1 and the general process described above a series of experiments was carried out in which to the mixing vessel were supplied sulphuric acid of strength 2.5M and a lignin solution of strength 8% produced from straw to give mixtures in the vessel having a series of pH values in the range 1.8 to 4.6. The agitator speed was 4200–5300 rpm and the temperature was between 60° C. and 65° C. In each case the lignin produced was filtered after 2 minutes from precipitation. The filter cake was washed with 3 cake volumes of water at 50° C. and then dried in a vacuum oven at 60° C. The ash content of the lignin produced in each experiment was measured by the method of ash determination given in the British Pharmacopoeia 1958, p 884. The results are shown in FIG. 2 which is a graph of % ash content as ordinate against pH as abscissa. It can be seen from the graph that the ash content is low at pHs between 1.8 and 4.

EXAMPLE 2

Figure 3:
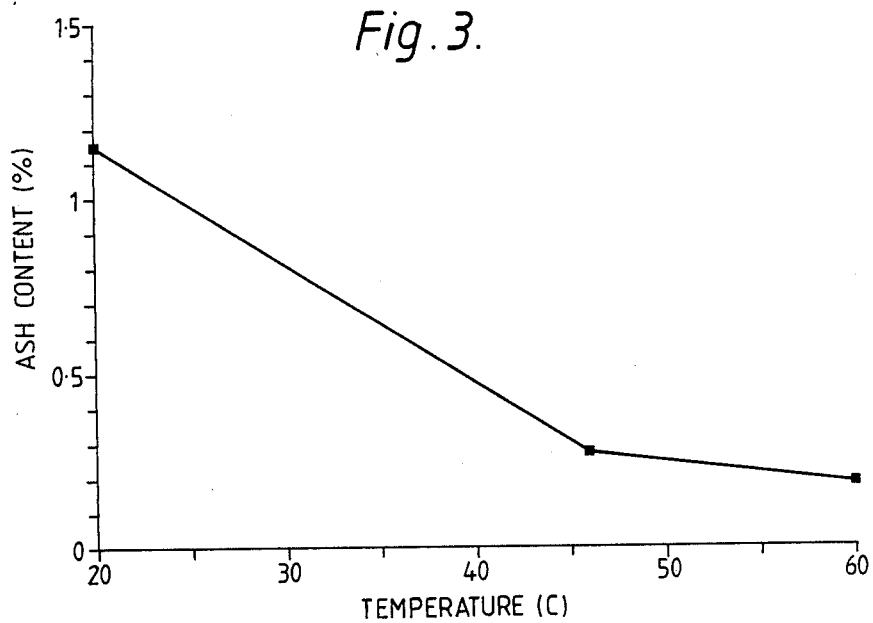
FIG. 3 is a graph of % ash content as ordinate against temperature (°C.) as abscissa setting out the results of Example 2 below.

Using the apparatus of FIG. 1, experiments were carried out at temperatures of 20°, 46° and 60° C. respectively at pHs between 3.8 and 4 and using the other conditions described in Example 1. Ash contents of the precipitated lignins were determined as in Example 1. The results are shown in FIG. 3 which is graph of % ash content as ordinate against temperature as abscissa. From this it can be seen that the results at 46° and 60° C. are very low.

EXAMPLE 3

Figure 4:
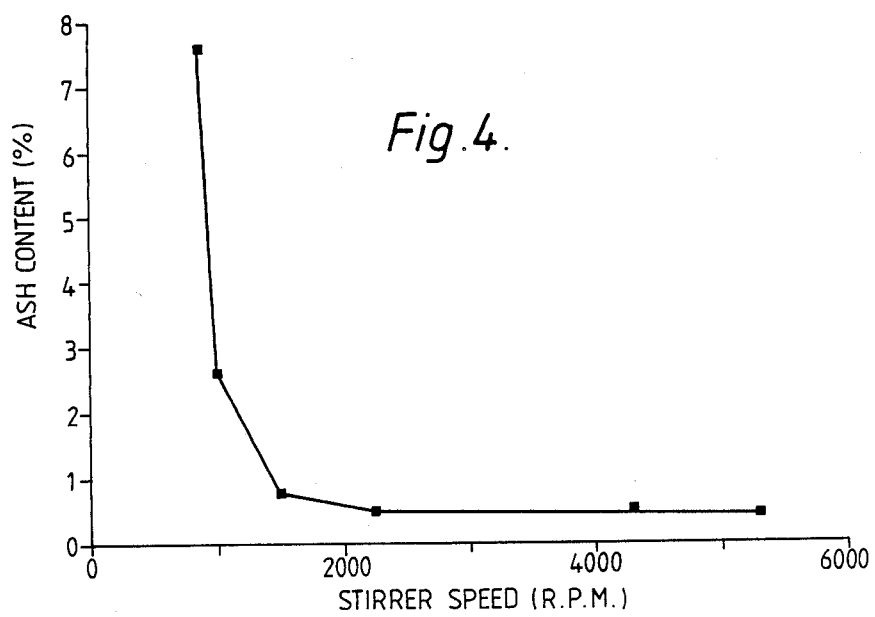
FIG. 4 is a graph of % ash content as ordinate against stirrer speed (r.p.m.) as abscissa setting out the results of Example 3 below.

Using the apparatus of FIG. 1 with the simple propeller agitation used in our other examples, a series of experiments were carried out at different propeller speeds. Temperatures in each experiment were in the range 65° to 68° C. and pHs in the range 3.5 to 3.7. The other conditions were as described in Example 1. Ash contents were determined as described in Example 1. A graph of % ash content as ordinate against stirrer speed (rpm) as abscissa is shown in FIG. 4. From this it can be seen that stirrer speeds above 2000 r.p.m. result in very low ash contents.

EXAMPLE 4

Figure 5:
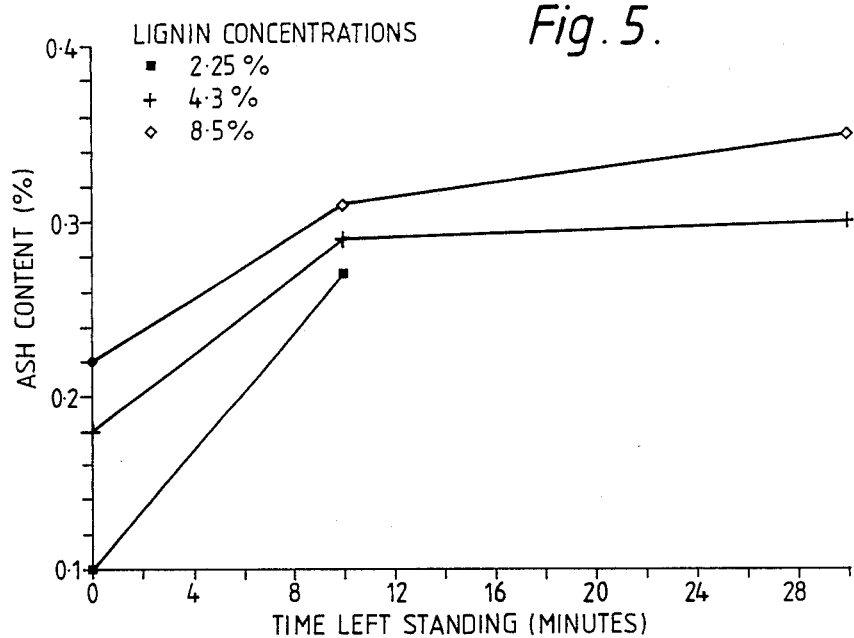
FIG. 5 is a graph of % ash content as ordinate against time left standing (minutes) as abscissa setting out the results of Example 4 below.

Using the apparatus of FIG. 1, experiments were carried out to determine the effects of leaving the precipitated lignin to stand (ageing) for different periods of time before filtration and washing. Batches of 400 mls of 2.25%, 4.3% and 8.5% lignin solution were precipitated and left to stand for 0, 10 or 30 minutes before filtration. The filtered cake was then washed with 3×200 mls of water at 50° C. for each case. The lignin was then dried and an ash determination carried out as described in Example 1. The results are set out in FIG. 5 which is a graph of % ash content as ordinate against time left standing (minutes) as abscissa. FIG. 5 shows that the filtration of precipitated lignin should be carried out as soon as possible after precipitation in order to minimize the presence of ash in the final lignin product.

EXAMPLE 5

Figure 6:
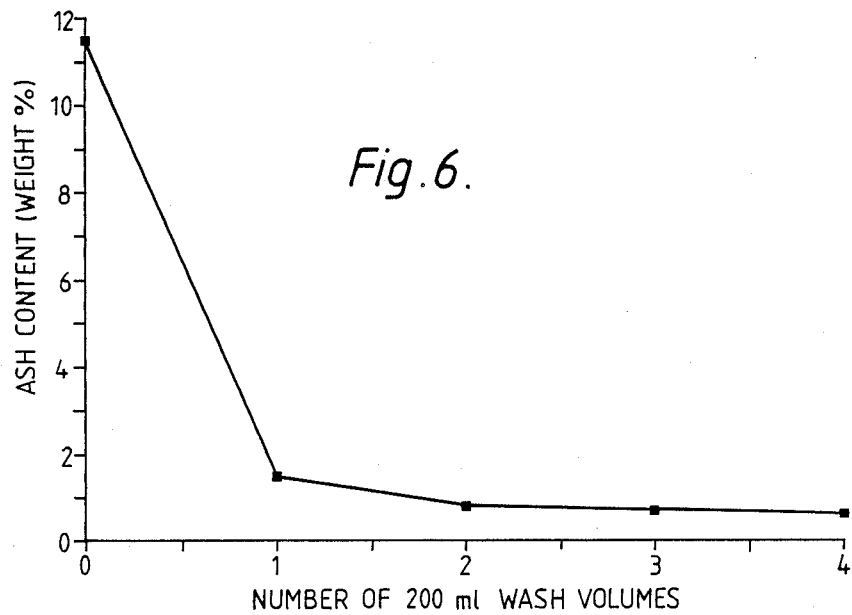
FIG. 6 is a graph of % ash content as ordinate against number of 200 ml wash volumes as abscissa setting out the results of Example 5 below.

Using the apparatus in FIG. 1, experiments were carried out to demonstrate the effect of washing the lignin filter cake on the final ash content. 2000 mls of a lignin solution of 4.4% concentration were precipitated at pH 3.1 using 2.5M sulphuric acid. 400 ml aliquots of the lignin slurry were taken and filtered on a Buchner Filter and then washed with 0, 1, 2, 3 and 4×200 mls of wash water at room temperature. The lignin filter cake was then dried at 60° C. in a vacuum oven and analysed for ash as described in Example 1. FIG. 6, which is a graph of % ash content as ordinate against number of 200 ml wash volumes as abscissa, shows the results of this experiment and demonstrates that at least 1 volume of wash water is desirable and, in practice, 1–4 wash volumes are preferably to be used.

We claim:

1. A process for the production of lignin by precipitation from an aqueous solution containing it in which the solution is acidified and agitated at a temperature in the range 10° to 100° C., the solution being treated with sufficient acid to produce a pH in the range 1.8 to 4 thereby precipitating the lignin; and the precipitated lignin is then separated from accompanying liquid, wherein the lignin-containing solution and the acid are introduced by simultaneous cocurrent flow into an agitated mixing region, the precipitated lignin is separated not more than 60 minutes after precipitation and the separated lignin is subsequently washed.

2. A process according to claim 1 wherein the precipitated lignin is separated not more than 20 minutes after precipitation.

3. A process according to claim 2 wherein the precipitated lignin is separated between 0.1 and 10 minutes after precipitation.

4. A process according to claim 1 wherein the solution is treated with sufficient acid to produce a pH for the solution after acidification in the range 3 to 4.

5. A process according to claim 1 wherein the temperature is within the range 50° to 70° C.

6. A process according to claim 1 wherein the acid is supplied to the mixing region at a concentration in the range 0.1 to 5M.

7. A process according to claim 1 wherein the lignin-containing solution which is supplied to the mixing region contains lignin at a concentration in the range 2% to 10% w/v.

8. A process according to claim 1 wherein in the mixing region a mechanical agitator is used to give specific power inputs greater than those obtained on a laboratory scale at agitator speeds above 2000 rpm.

9. A process according to claim 1 wherein after separation the precipitated lignin is washed with water at a temperature in the range 20° to 60° C.

10. In a process for the treatment of lignocellulosic material to produce a product which comprises the following steps:
  (1.) a first step in which the lignocellulosic material is treated with an acid at a concentration in the range 0.5%–5% to produce a sugar-containing solution and a solid material containing lignin and cellulose;
  (2.) a second step in which the products of the first step are separated by filtration;
  (3.) a third step in which the solid material from the second step is treated with alkali solution at a concentration in the range 0.5%–5% at a temperature in the range 70° to 130° C. to produce a lignin-containing solution and cellulose pulp;
  (4.) a fourth step in which the products of the third step are separated by filtration;
  (5.) a fifth step in which the lignin-containing solution separated in the fourth step is acidified and agitated at a temperature in the range 10° to 100° C., the lignin-containing solution being treated with sufficient acid to produce a pH in the range 1.8 to 4 thereby precipitating the lignin; and the precipitated lignin is then separated from accompanying liquid; and
  (6.) a sixth step in which the cellulose pulp separated in the fourth step is further treated:
the improvements in the fifth step comprising introducing the lignin-containing solution and the acid by simultaneous cocurrent flow into an agitated mixing region, filtering the precipitated lignin not more than 60 minutes after precipitation and subsequently washing the filtered lignin.

* * * * *